(12) United States Patent
Naor et al.

(10) Patent No.: US 9,329,784 B2
(45) Date of Patent: May 3, 2016

(54) MANAGING POLICIES USING A STAGING POLICY AND A DERIVED PRODUCTION POLICY

(75) Inventors: Yaniv Naor, Ramat-HaSharon (IL); Idan Doitch, Hod-Hasharon (IL); Noam Gershon Ben-Yochanan, Petach Tikva (IL); Eran Ben-Shahar, Herzeliya (IL); Ittai Doron, Tel Aviv (IL); Yafit Cohen, Petach Tikva (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 609 days.

(21) Appl. No.: 13/273,202

(22) Filed: Oct. 13, 2011

(65) Prior Publication Data

US 2013/0097653 A1 Apr. 18, 2013

(51) Int. Cl.
*G06F 21/00* (2013.01)
*G06F 3/06* (2006.01)
*H04L 29/06* (2006.01)

(52) U.S. Cl.
CPC ............ *G06F 3/0613* (2013.01); *G06F 3/0659* (2013.01); *G06F 3/0676* (2013.01); *H04L 63/102* (2013.01); *H04L 63/20* (2013.01)

(58) Field of Classification Search
USPC .......................................................... 726/1
See application file for complete search history.

(56) References Cited

U.S. PATENT DOCUMENTS

| 6,466,932 | B1 | 10/2002 | Dennis et al. | |
| 6,978,379 | B1 | 12/2005 | Goh et al. | |
| 7,890,990 | B1 | 2/2011 | Vainstein et al. | |
| 2002/0178249 | A1 | 11/2002 | Prabakaran et al. | |
| 2004/0083386 | A1 | 4/2004 | Marquet et al. | |
| 2006/0143685 | A1 | 6/2006 | Vasishth et al. | |
| 2006/0190987 | A1* | 8/2006 | Ohta et al. | 726/1 |
| 2007/0153814 | A1 | 7/2007 | Canning et al. | |
| 2007/0156691 | A1 | 7/2007 | Sturms et al. | |
| 2009/0178111 | A1* | 7/2009 | Moriconi et al. | 726/1 |
| 2009/0254972 | A1 | 10/2009 | Huang et al. | |

FOREIGN PATENT DOCUMENTS

EP 2375360 A1 10/2011

OTHER PUBLICATIONS

"Group Policy Planning and Deployment Guide", Retrieved at <<http://technet.microsoft.com/en-us/library/cc754948(WS.10).aspx#Mtps_DropDownFilterText>>, Retrieved Date: Jul. 18, 2011, pp. 78.

(Continued)

*Primary Examiner* — Alexander Lagor
(74) *Attorney, Agent, or Firm* — Aneesh Mehta; Kate Drakos; Micky Minhas

(57) ABSTRACT

Aspects of the subject matter described herein relate to managing policies. In aspects, a staging store is used to store policies that are not applied to a computer system unless and until they are copied to or otherwise imported into a production store. A configuration entity is allowed read/write access to the staging store, but is not allowed write access to the production store. A policy manager is granted read access to the staging store and write access to the production store. The policy manager may approve or deny staging policies. If the policy manger approves a staging policy, the policy manager may derive a production policy from the staging policy and store the production policy in the production store. Once a policy is in the production store, the policy may be applied to one or more entities as appropriate.

20 Claims, 6 Drawing Sheets

(56) References Cited

OTHER PUBLICATIONS

"In Microsoft Active Directory, what are group policies?", Retrieved at <<http://kb.iu.edu/data/ajgk.html>>, Retrieved Date: Jul. 18, 2011, p. 1.

"Group Policy Collection", Retrieved at <<http://technet.microsoft.com/en-us/library/cc779838(WS.10).aspx>>, Mar. 28, 2003, pp. 9.

"Group Policy Processing", Retrieved at <<http://technet.microsoft.com/en-us/library/cc758898(WS.10).aspx>>, Apr. 7, 2003, pp. 9.

"International Search Report", Mailed Date: Jan. 21, 2013, Application No. PCT/US2012/059413, Filed Date: Oct. 10, 2012, pp. 10.

Chinese Patent Application No. 201210390573.0, Office Action dated Sep. 25, 2014, 15 pages (including English language summary).

Chinese Patent Application No. 201210390573.0, Response to Office Action dated Feb. 5, 2015, 3 pages (including English language summary).

"Second Office Action Received for Chinese Patent Application No. 201210390573.0", Mailed Date: May 25, 2015, 10 Pages.

"Supplementary Search Report Received for European Patent Application No. 12840354.0", Mailed Date: May 19, 2015, 7 Pages.

Chinese Patent Application No. 201210390573.0 (foreign counterpart application to U.S. Appl. No. 13/273,202), Amendment dated Aug. 3, 2015, 14 pages (includint English translation of claims and English Summary of Argument).

European Patent Application No. 12 840 354.0, Response dated Dec. 16, 2015, 17 pages.

Chinese Patent Application No. 201210390573.0 (foreign counterpart application to U.S. Appl. No. 13/273,202), Office Action dated Dec. 2, 2015, 3 pages.

Chinese Patent Application No. 201210390573.0, (foreign counterpart application to U.S. Appl. No. 13/273,202), Amendment dated Dec. 15, 2015, 10 pages (including summary of response and amended claims).

* cited by examiner

MANAGING POLICIES USING A STAGING POLICY AND A DERIVED PRODUCTION POLICY

BACKGROUND

The person who decides a policy for a computer system may not be the same person who creates an object that embodies the policy for the computer system. Furthermore, the person who creates, manages, or decides the object may not be the same person who has permission to configure the computer system to apply the policy embodied by the object. Granting permission to the policy decider or the policy object creator to configure the computer system to enforce the policy may weaken the security of the computer system, increase the risk of performance issues from poor configuration choices, violate regulatory or corporate policy, or have other potential adverse consequences.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to managing policies. In aspects, a staging store is used to store policies that are not applied to a computer system unless and until they are copied to or otherwise imported into a production store. A configuration entity is allowed read/write access to the staging store, but is not allowed write access to the production store. A policy manager is granted read access to the staging store and write access to the production store. The policy manager may approve or deny staging policies. If the policy manger approves a staging policy, the policy manager may derive a production policy from the staging policy and store the production policy in the production store. Once a policy is in the production store, the policy may be applied to one or more entities as appropriate.

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed. Use of the phrase "one or more" in a claim or elsewhere herein does not imply a different definition of the terms above even if found in a claim, sentence, or paragraph that uses one or more of the terms above.

Sometimes herein the terms "first", "second", "third" and so forth may be used. Without additional context, the use of these terms in the claims is not intended to imply an ordering but is rather used for identification purposes. For example, the phrase "first version" and "second version" does not necessarily mean that the first version is the very first version or was created before the second version or even that the first version is requested or operated on before the second versions. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
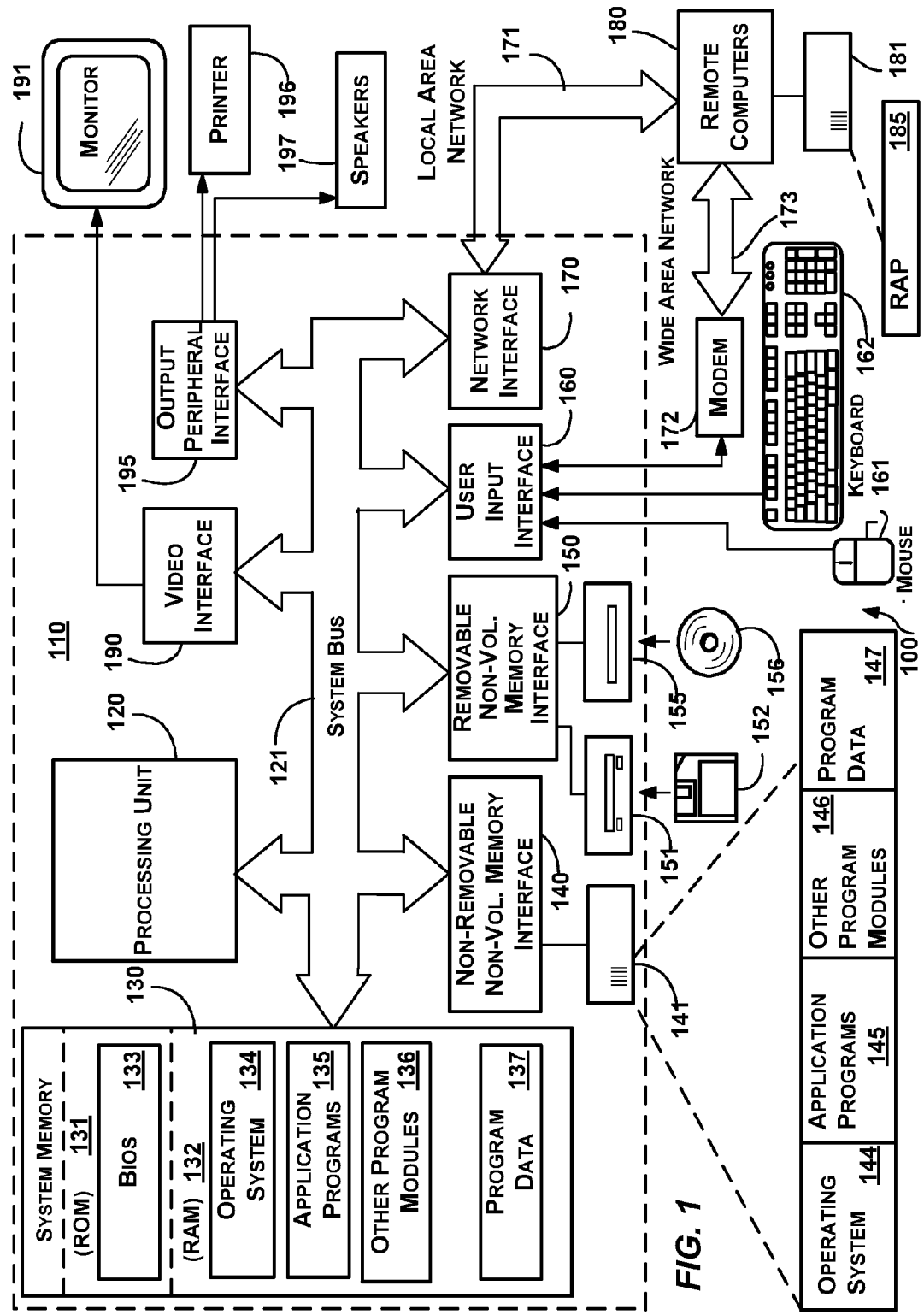
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and non-volatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/ nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable non-volatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Managing Policies

As mentioned previously, multiple people may be involved with policies for a computer system. Granting permission to everyone to configure the computer system to apply the policy may be undesirable.

Figure 2:
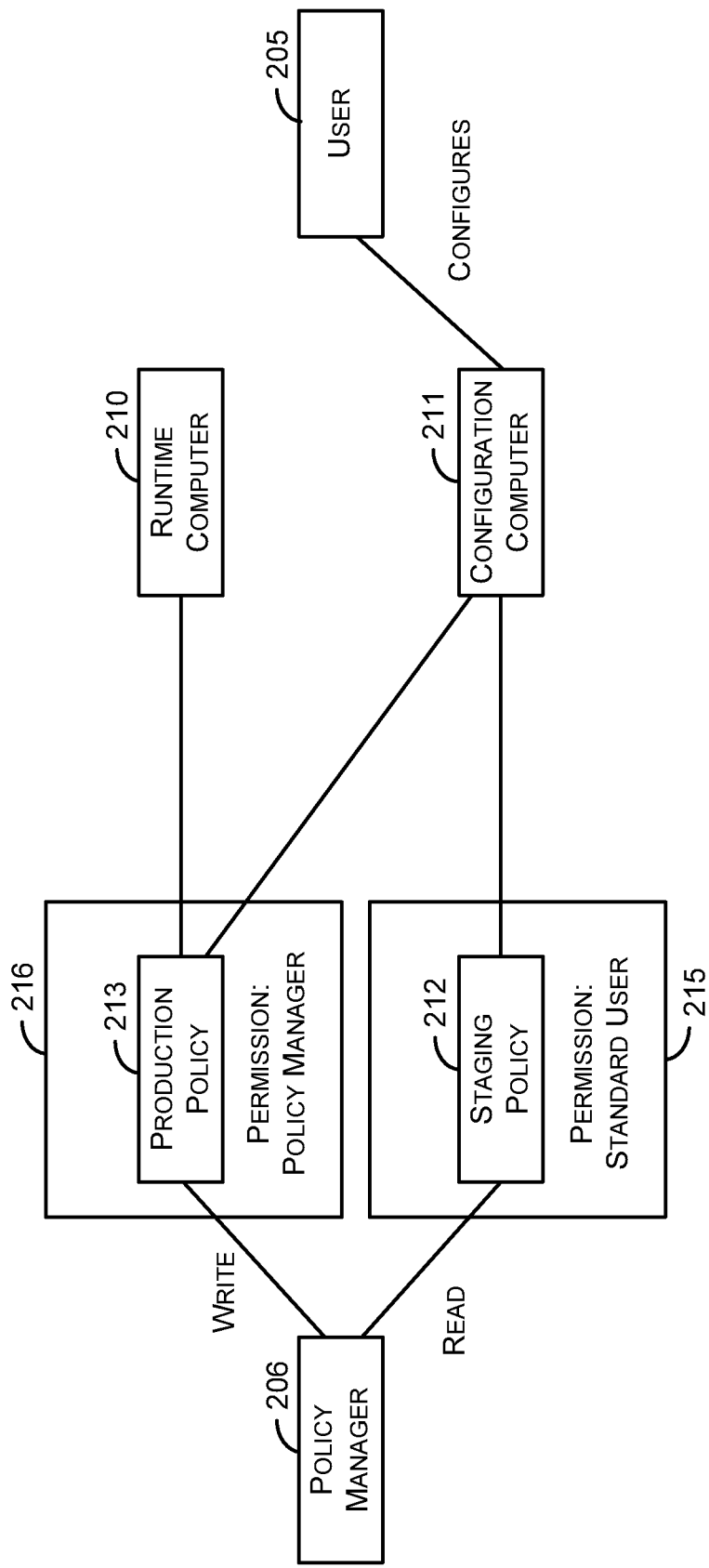
FIG. 2 is a block diagram that generally represents an environment in accordance with aspects of the subject matter described herein.

FIG. 2 is a block diagram that generally represents an environment in accordance with aspects of the subject matter described herein. The entities illustrated in FIG. 2 are exemplary and are not meant to be all-inclusive of entities that may be needed or included. In other embodiments, the entities described in conjunction with FIG. 2 may be included in other entities (shown or not shown) or placed in sub entities without departing from the spirit or scope of aspects of the subject matter described herein. In some embodiments, the entities and/or functions described in conjunction with FIG. 2 may be distributed across multiple devices.

The computers 210-211 illustrated in FIG. 2 and any other computers, if any, used to access the production store 213 and the staging store 212 may be implemented using one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like.

An exemplary device that may be configured to implement the computers 210-211 of FIG. 2 comprises the computer 110 of FIG. 1.

Using a user interface of the configuration computer 211, a user 205 (e.g., a configuration administrator or the like) may define an object that embodies a staging policy. Defining an object may involve performing actions that result in the creation of the object. For example, the user 205 may configure some settings which then get translated into a policy object. In one example, a staging policy object may be created or initially defined by the policy manager 206 and the user 205 may be given permissions to modify the policy embodied by the staging policy object. Hereafter, the term policy is often used to refer to the object or other data that embodies the policy unless the context indicates otherwise.

A policy may include one or more settings that are to be applied to one or more users, machines, or other entities. A policy may indicate preferences that are to be used to optionally configure a computer. For example, a policy may include preferences that may be used for configuration when the configuration is missing from or incomplete on the computer. A policy may indicate what an entity can and cannot do. For example, a policy may indicate that a user is not allowed to download executable files. As another example, a policy may indicate restricted access to certain folders. As another example, a policy may indicate what operating system components a user may execute, what icons are to be shown on a desktop, what programs a user is allowed to execute, and so forth. As another example, a policy may indicate configuration data and rules to enforce secure network connections.

The examples above are not intended to be all-inclusive or exhaustive of what may be indicated by a policy. Indeed, a policy may include other types of data to apply to one or more users, machines, or other entities without departing from the spirit or scope of aspects of the subject matter described herein.

In one embodiment, the user 205 may have rights to read from and write to objects in a staging store 215. In another embodiment, the user 205 may have an additional right to read objects from the production store 216. The policy manager 206 may have the above rights (or at least read rights to the staging store 215) and an additional right of being able to write to the production store 216. With the above rights, in one embodiment, the user 205 can read and change the staging policy 212 but not read or change the production policy 213. In one embodiment, the user 205 may also be able to read from the production policy 213 to obtain a location for staging policy 212.

In the embodiment in which the user 205 has rights to read from and write to objects in the staging store 215 and no rights to read from or write to the production store 216, the communication line from the production policy 213 to the configuration computer 211 may be omitted. In this embodiment, the configuration computer 211 may obtain the location of the staging policy 212 from data stored on the configuration computer 211, from the runtime computer 210, or from another data store (not shown).

The policy manager 206 may comprise a computing device (e.g., like one of the computers 210-211) that approves or denies staging policies based on a program that executes on the device, a domain administrator or other person that may approve or deny staging policies, a combination of a computing device and a domain administrator or other person, and the like. The policy manager 206 may also derive production policies from staging policies as described in more detail below.

The stores 215-216 may include any storage media capable of storing data. The stores 215-216 may include volatile memory (e.g., a cache), non-volatile memory (e.g., a persistent storage), storage media described in conjunction with FIG. 1, and the like. In one example, the stores 215-216 may be accessible via the Internet (e.g., as cloud storage).

The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

In one embodiment, the production store 216 and the staging store 215 may be part of the same store. In this embodiment, production policies may be distinguished from staging policies by their names, locations (e.g., directories, database tables or other database objects, and the like), metadata, or other data about or included in the policies.

The staging store 215 is operable to provide access to the staging policy 212 in accordance with rights that are associated with the staging store 215. These rights may allow a configuration entity (e.g., the user 205, the configuration computer 211, or another entity) to read staging policies from and write staging policies to the staging store 215. A policy included on the staging store 215 is not allowed to be applied until a copy of the policy is stored on the production store 216.

The production store 216 is operable to provide access to the production policy 213 in accordance with access rights associated with the production policy 213. The production store 216 is associated with a right that disallows the configuration entity mentioned above from writing to the production store 216.

The policy manager 206 is operable to derive the production policy from the staging policy and to store the production policy to the production store. The policy manager 206 has at least write access to the production store 216.

As used herein a database may comprise a relational database, object-oriented database, hierarchical database, network database, binary files of a group policy of a directory service, other types of database, some combination or extension of the above, and the like. Data stored in a database may be organized in tables, records, objects, other data structures, and the like. The data stored in a database may be stored in dedicated database files, dedicated hard drive partitions, HTML files, XML files, spreadsheets, flat files, document files, configuration files, other files, and the like. A database may reference a set of data that is read-only to the database or may have the ability to read and write to the set of data.

Data in a database may be accessed via a database management system (DBMS). A DBMS may comprise one or more programs that control organization, storage, management, and retrieval of data of a database. A DBMS may receive requests to access data in a database and may perform the operations needed to provide this access. Access as used herein may include reading data, writing data, deleting data, updating data, a combination including two or more of the above, and the like.

In describing aspects of the subject matter described herein, for simplicity, terminology associated with relational databases is sometimes used herein. Although relational database terminology is sometimes used herein, the teachings herein may also be applied to other types of databases including those that have been mentioned previously.

In another embodiment, the production store 216 and the staging store are two different stores.

The staging policy 212 is not applied on computers (e.g., the runtime computer 210) of a domain or other organizational unit. A production policy 213 derived from the staging policy 212, however, may be applied to one or more computers of the domain or other organizational unit. In one embodiment, the production policy 213 may be created, updated, or deleted only by an administrator or other entity having write permission to the production store 216. In one example, the policy manager 206 has such permission and may create/update the production policy 213 from the staging policy 212. The term "deriving" and its variants are sometimes used herein to indicate that a production policy is created or updated from a staging policy.

In one example, the policy manager 206 may derive the production policy 213 from the staging policy 212 by exporting the staging policy 212 into a file and importing the exported file into the production store 216. In another example, the policy manager 206 may derive the production policy 213 from the staging policy 212 by copying the staging policy 212 to a directory of the production store 216. In another embodiment, the policy manager 206 may derive the production policy 213 from the staging policy 212 by updating a database that includes the production policy 213.

The examples above are not intended to be all-inclusive or exhaustive of ways to deriving the production policy 213 from the staging policy 212. Based on the teachings herein, those skilled in the art may recognize other ways of deriving the production policy 213 from the staging policy 212 without departing from the spirit or scope of aspects of the subject matter described herein.

Before deriving the production policy 213 from the staging policy 212, the policy manager 206 may validate the staging policy 212 to ensure that the production policy that would be derived from staging policy 212 is safe to be applied. This validation may include examining the rules of the staging policy 212, examining rules of other policies, examining other data of the staging policy 212, and the like.

Policies that are included in the production store 216 are applied to computers, users, or other entities of a computing environment as appropriate. For example, the production policy 213 derived from the staging policy 212 may be applied to the runtime computer 210. In addition, production policies stored in the production store 216 may be read by the configuration computer 211 and used to obtain an indication of where the staging policy 212 is stored as indicated below.

In one embodiment, the production policy 213 may include an indication of where the staging policy 212 is stored. For example, the production policy 213 may include a pointer to the staging policy 212. As another example, the production policy 213 may include a path of the staging store 215. This path may indicate where the staging policy 212 is stored. As another example, the production policy 213 may include a name of the staging policy 212. As another example, the production policy 213 may include an identifier of a database object for use in reading and writing the staging policy.

In another embodiment, the configuration computer 211 may store (e.g., in cache or other storage) a pointer to the staging policy 212 or obtain the pointer from the runtime computer 210. In this embodiment, the configuration computer 211 may obtain the location of the staging policy 212 without reading from the production store 216.

Hereinafter, the term "pointer" is used to refer to any data that may be used to locate the staging policy 212 with the understanding that a pointer may include any data that may serve to identify where the staging policy 212 is stored.

A user seeking to modify the production policy 213 may retrieve the production policy 213. If there is a non-empty staging policy (e.g., the staging policy 212) associated with the production policy 213, the configuration computer 211 may display a user interface corresponding to the staging policy to allow the user to make modifications to the staging policy. Otherwise, the configuration computer 211 may display a user interface corresponding to a copy of the production policy 213, the user may make modifications to the copy of the production policy, and when the copy is saved it is saved as a staging policy (e.g., the staging policy 212) that corresponds to the production policy 213.

In another embodiment, the location of the staging policy 212 may be stored in a database accessible by the configuration computer (e.g., a data store located on the runtime computer 210). In this embodiment, to modify the staging policy 212, the configuration computer 211 may access the database and retrieve the location of the staging policy 212. Using the location, the configuration computer 211 may retrieve the staging policy 212 from the staging store 215 and allow the user to modify the staging policy 212 via a user interface.

After changing the staging policy, the user 205 may inform the policy manager 206 that the staging policy is ready to be applied. In response, the policy manager 206 may validate the staging policy and derive the production policy 213 from the staging policy 212 as described previously.

In one implementation, the policy manager 206 may create a staging policy and indicate where the staging policy is stored to the user 205. The user 205 may then modify the staging policy as desired and inform the policy manager 206 when the staging policy is ready to be used to create a production policy.

In one implementation, there may be multiple objects associated with a policy. For example, the staging policy 212 may be implemented as an object that stores server configuration data, an object that stores client configuration data, an object that stores other device configuration data, other objects, and the like. Corresponding objects may be derived from each of these objects to implement the production policy 213. For example, the policy manager 206 may validate and copy each of these objects from the staging store 215 to the production store 216. The program that the policy manager 206 uses to copy the objects may ensure that either all the objects associated with a staging policy are copied from the staging store 215 to the production store 216 or that none of the objects associated with the staging policy are copied. This may be done, for example, to ensure consistency in applying the production policy across different entities of different domains, a single domain, or other organizational unit.

In enforcing a policy, the appropriate object of a production policy may be used depending on the target upon which the policy is to be enforced.

In another implementation, there may be a single object associated with a policy. For example, an Extensible Language Markup (XML) document may encode a policy and indicate which rules or other configuration data are applicable to what types of targets. A target receiving the document may then apply the appropriate rules and/or other configuration data.

FIGS. 3-6 are flow diagrams that generally represent exemplary actions that may occur in accordance with aspects of the subject matter described herein. For simplicity of explanation, the methodology described in conjunction with FIGS. 3-6 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Figure 3:
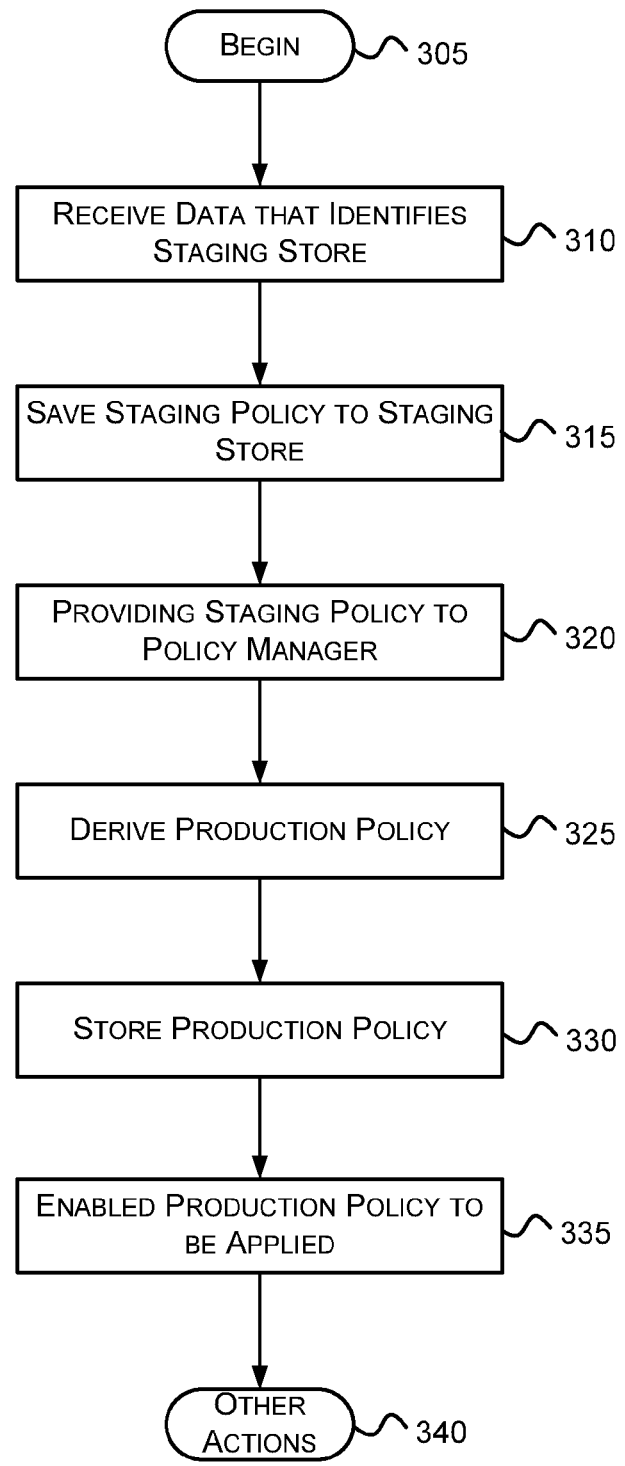
FIGS. 3-6 are flow diagrams that generally represent exemplary actions that may occur in accordance with aspects of the subject matter described herein.

Turning to FIG. 3, at block 305, the actions begin. At block 310, an indication is received that identifies a staging store for use in storing a staging policy. The staging store is associated with rights that allow a configuration entity to read staging policies from and write staging policies to the staging store. The staging store is operable to store one or more policies that are not allowed to be applied until the one or more policies are stored on a production store.

For example, referring to FIG. 2, the configuration computer 211 may receive a pointer that identifies a name of a staging policy. This name may then be usable to locate the staging store for the staging policy.

As another example, receiving an indication of the staging store may include receiving a path that identifies a location for use in reading and writing the staging policy. For example, referring to FIG. 2, the configuration computer 211 may receive a file path, resource name, or other path that identifies a location for use in reading and writing the staging policy 212.

As another example, receiving an indication of a staging store may include receiving an identifier of a database object (e.g., a key of a row of a table, a pointer to the database object, or the like) for use in reading and writing the staging policy 212. In this example, the database may comprise the staging store. The database may be local (e.g., located on a storage device hosted by the computer) to the configuration computer 211 (e.g., a registry or other local database of the configuration computer) or may be remote (e.g., in a registry or other database of the runtime computer) to the configuration computer 211 but accessible via a network, other communication link, or the like.

As another example, receiving an indication of a staging store may include receiving the indication from a production policy. For example, referring to FIG. 2, the configuration computer 211 may receive the indication of a staging store 215 for the staging policy 212 from the production policy 213.

Returning to FIG. 3, at block 315 the staging policy is saved to the staging store. For example, referring to FIG. 2, the configuration computer 211 may present a user interface that allows the user 205 to create/change the staging policy. After making any desired modifications, the user 205 may instruct the configuration computer 211 to save the policy. In response, the configuration computer 211 may save the staging policy 212 to the staging store 215.

At block 320, the staging policy is provided to a policy manager. For example, referring to FIG. 2, after the configuration computer has saved the staging policy 212 in the staging store 215, the policy manager 206 may receive a notification that a staging policy 212 is ready for review. The staging policy 212 may be provided, for example, to an administrator via the user interface of a configuration tool that allow the administrator to review the staging policy 212 and determine whether to approve or deny the staging policy 212.

At block 325, a production policy may be derived from the staging policy. For example, referring to FIG. 2, the policy manager 206 may prepare to copy the staging policy 212 from the staging store 215 to the production store 216 to form the production policy 213. As another example, the policy manager 206 may export the staging policy 212 to a file.

At block 330, the production policy may be stored on the production store. For example, referring to FIG. 2, if the production manager 206 approves the staging policy 212, the policy manager 206 may cause a copy of the staging policy 212 to be stored on the product store 216 as the production policy 213. As mentioned previously, the production store 216 may be associated with an access right that denies the user 205 from writing to the production store 216.

At block 335, the production policy is enabled to be applied. Enabling the production policy may involve setting a flag, informing an enforcement mechanism that the production policy has changed or has been created, releasing a lock or other operating system or database resource, completing the copying of the staging policy to the production store, indicating that the storing the production policy in the production store has completed, or the like.

At block 340, other actions, if any, may be performed. For example, referring to FIG. 2, the policy manager 206 may determine that the staging policy 212 is not approved and may send a notification of this denial to the user 205. In response, the user may make changes to the staging policy 212 and cause the configuration computer 211 to store the staging policy 212 as changed to the staging store 215.

Figure 4:
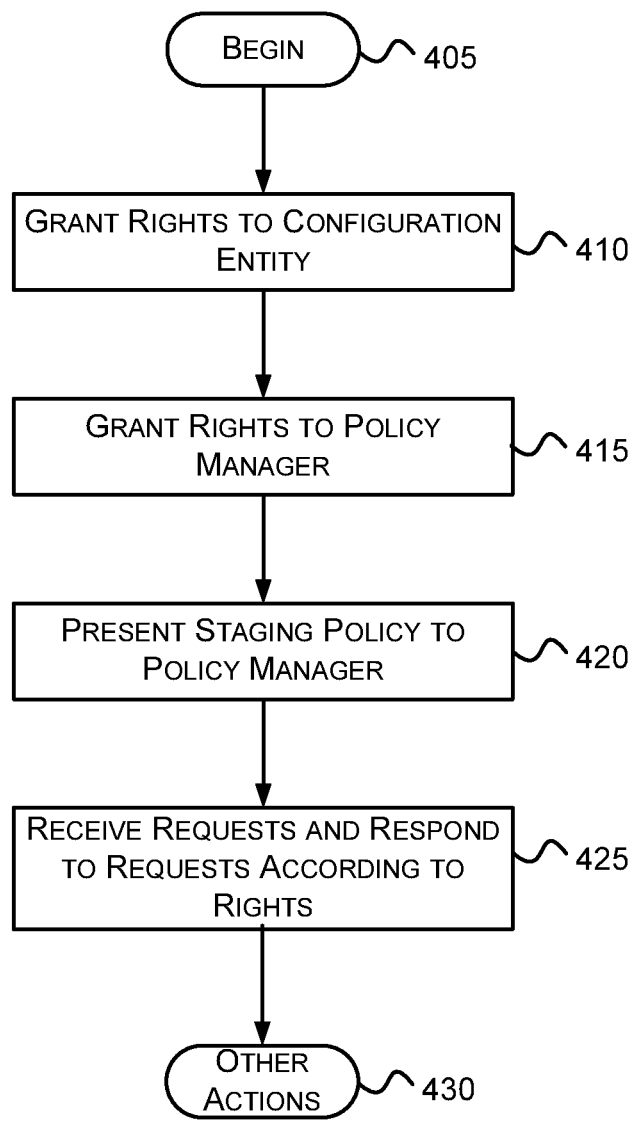

Turning to FIG. 4, at block 405, the actions begin. At block 410, rights are granted to a configuration entity. These rights include a right that allows the configuration entity to read a staging policy from a staging store, a right that allows the configuration entity to write the staging policy to the staging store. In one embodiment, the rights may also include a right that allows the configuration entity to read a production policy from the production store. These rights do not include a right that allows the configuration entity to write the production policy to the production store. For example, referring to FIG. 2, a system administrator or the like may grant the above rights to the user 205, the configuration computer 211, or some other entity that is allowed to create staging policies on the staging store 215.

At block 415, rights are granted to a policy manager. These rights include a right that allows the policy manager to read the staging policy from the staging store and a right that allows the policy manager to write the production policy to the production store. For example, referring to FIG. 2, a system administrator or the like may grant the above rights to the policy manager 206.

At block 420, a staging policy is presented to the policy manager. For example, referring to FIG. 2, the staging policy 212 may be presented to the policy manager 206 for review.

At block 425, requests regarding policies are received and responded to as appropriate. Two exemplary sets of requests and responses thereto are described in conjunction with FIGS. 5 and 6.

At block 430, other actions, if any, may be performed.

Figure 5:
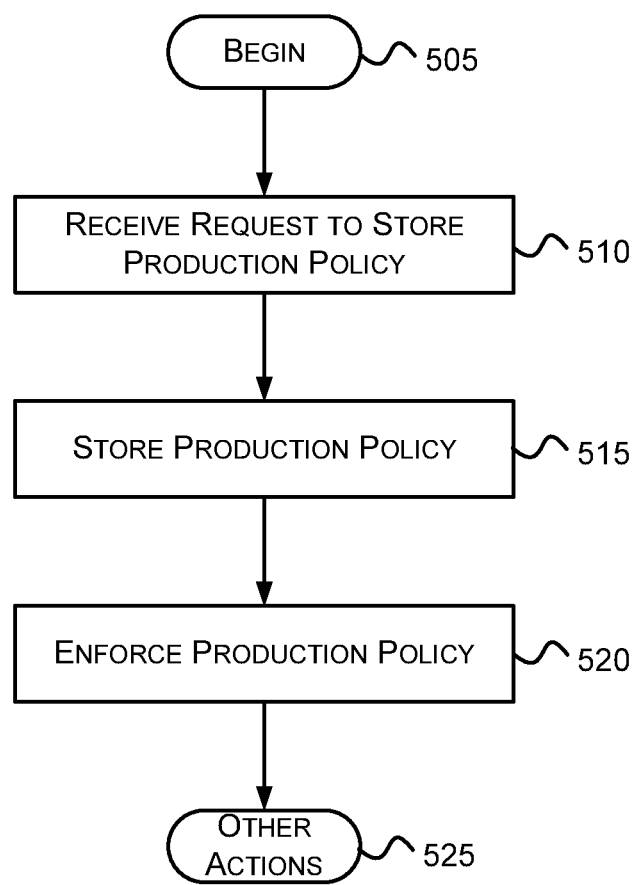

FIG. 5 is a flow diagram that generally represents exemplary actions that may occur in creating or updating a production policy on a production store in accordance with aspects of the subject matter described herein. At block 505, the actions begin.

At block 510, a request is received from a production manager to store a production policy on a production store. For example, referring to FIG. 2, the store 216 may receive a request to store the production policy 213 on the production store 216.

At block 515, in response to receiving the request after checking the rights of the requestor, the production policy may be stored on the production store. For example, referring to FIG. 2, in response to receiving the request and after checking the rights of the requestor, the production policy 213 may be stored on the production store 216.

At block 520, the production policy may be enforced. For example, referring to FIG. 5, the production policy 213 may be enforced on the runtime computer 210. This enforcement may include configuring the runtime computer 210 to enforce the production policy 213.

At block 525, other actions, if any, may be performed.

Figure 6:
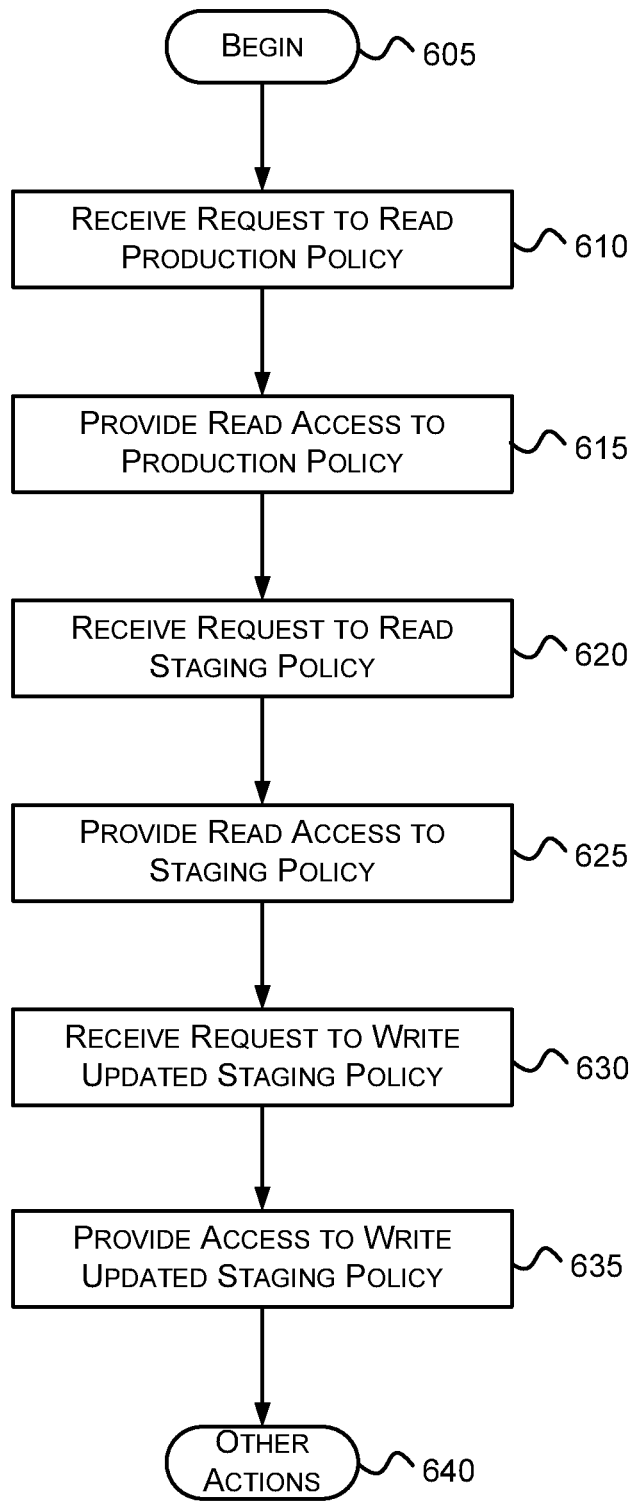

FIG. 6 is a flow diagram that generally represents exemplary actions that may occur in creating or updating a staging policy in accordance with aspects of the subject matter described herein. At block 605, the actions begin.

At block 610, a request is received from a configuration entity to read a production policy. For example, referring to FIG. 2, the configuration computer 211 may request to read the production policy 213 from the production store 216.

At block 615, in response to the request, read access may be provided to the requesting entity. For example, referring to FIG. 2, read access to the production policy may be given to the configuration computer 211.

In another embodiment, the actions of blocks 610 and 615 may be omitted. In this embodiment, the pointer may be read from a data store (e.g., a cache, store, or other memory or registry or other database) of the configuration computer 211 or a database of the runtime computer 210 and cached by the configuration computer 211 in a cache of the configuration computer 211.

At block 620, a request is received form the configuration entity to read a staging policy. For example, referring to FIG. 2, after obtaining the production policy 213, the configuration computer 211 may determine that the corresponding staging policy is the staging policy 212 of the staging store 215. The configuration computer 211 may then request to read the staging policy 212.

At block 625, in response to the request, access is provided to the configuration entity to read the staging policy. For example, referring to FIG. 2, the configuration computer 211 is given access to read the staging policy 212 of the staging store 215.

At block 630, a request is received to write an updated staging policy to the staging store. For example, referring to FIG. 2, after receiving the staging policy 212, the configuration computer 211 may be used by the user 205 (e.g., via a user or other interface) to update the staging policy 212.

At block 635, in response to the request, access is provided to the configuration entity to write the updated staging policy to the staging store. For example, referring to FIG. 2, the configuration computer 211 is allowed to write the updated staging policy 212 to the staging store 215.

At block 640, other actions, if any, may be performed.

As can be seen from the foregoing detailed description, aspects have been described related to caching data for a file system. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented by a computer, the method comprising:
    by a policy manager, reading a stored staging policy from a staging store, the staging store associated with rights that allow a configuration entity to read staging policies from and write staging policies to the staging store, the staging store operable to store one or more policies that are not allowed to be applied until the one or more policies are stored on a persistent production store;
    by the policy manager, validating the staging policy to ensure that a production policy that would be derived from the staging policy is safe to be applied;
    by the policy manager, deriving the production policy from the staging policy;
    by the policy manager, storing the production policy on the persistent production store, the persistent production store associated with an access right that denies the configuration entity from writing to the persistent production store; and
    enabling the production policy to be applied to a runtime computer to configure the runtime computer to enforce the production policy.

2. The method of claim 1, further comprising receiving an indication of the staging store for use in storing the staging policy, wherein receiving the indication of the staging store for use in storing the staging policy comprises receiving a pointer that identifies a name of the staging policy.

3. The method of claim 1, further comprising receiving an indication of the staging store for use in storing the staging policy, wherein receiving the indication of the staging store for use in storing the staging policy comprises receiving a path that identifies a location for use in reading and writing the staging policy.

4. The method of claim 1, further comprising receiving an indication of the staging store for use in storing the staging policy, wherein receiving the indication of the staging store for use in storing the staging policy comprises receiving an identifier of a database object for use in reading and writing the staging policy.

5. The method of claim 1, further comprising receiving an indication of the staging store for use in storing the staging policy, wherein receiving the indication of the staging store for use in storing the staging policy comprises obtaining the indication from a production policy.

6. The method of claim 1, further comprising receiving an indication of the staging store for use in storing the staging policy, wherein receiving the indication of the staging store for use in storing the staging policy comprises obtaining the indication from a database local to a runtime computer the configuration entity is attempting to configure.

7. The method of claim 1, wherein deriving a production policy from the staging policy comprises exporting the staging policy to a file.

8. The method of claim 1, wherein deriving a production policy from the staging policy comprises preparing to make a copy of the staging policy.

9. The method of claim 1, further comprising providing the staging policy to a user who has rights to write policies to the persistent production store.

10. The method of claim 1, further comprising receiving an indication of the staging store for use in storing the staging policy, wherein receiving the indication of the staging store for use in storing the staging policy comprises receiving an identifier of a database object for use in reading and writing the staging policy, wherein enabling the production policy to be applied comprises at least one of setting a flag, informing an enforcement mechanism that the production policy has changed or has been created, releasing a lock or database resource or completing a copying of the staging policy to the persistent production store.

11. The method of claim 1, further comprising receiving an indication that the staging policy was not approved, loading the staging policy from the staging store, receiving changes to the staging policy, and storing the staging policy as changed to the staging store.

12. In a computing environment, a system, comprising:
a staging store configured to provide access to a staging policy, the staging store associated with rights that allow a configuration entity to read staging policies from and write staging policies to the staging store, the staging store operable to provide access to one or more policies that are not allowed to be applied until the one or more policies are stored on a persistent production store;
the persistent production store configured to provide access to a production policy, the persistent production store associated with a right that disallows the configuration entity from writing to the persistent production store; and
a policy manager comprising a computer configured to derive the production policy from the staging policy and to store the production policy to the persistent production store, the policy manager having at least write access to the persistent production store, the production policy configured to be applied to a runtime computer to configure the runtime computer to enforce the production policy.

13. The system of claim 12, wherein the configuration entity comprises a configuration computer, the configuration computer operable to provide a user interface by which a user is allowed to define the staging policy.

14. The system of claim 13, wherein the configuration computer is further operable to access a database local to a runtime computer to determine a location of the staging store.

15. The system of claim 13, store wherein enforcing the production policy comprises at least one of setting a flag, informing an enforcement mechanism that the production policy has changed or has been created, releasing a lock or database resource or completing a copying of the staging policy to the production store, and wherein the policy manager is further configured to receive an indication of the staging store for use in storing the staging policy, wherein receiving the indication of the staging store for use in storing the staging policy comprises receiving an identifier of a database object for use in reading and writing the staging policy.

16. The system of claim 12, further comprising a runtime computer to which the production policy is to be applied, the runtime computer having read access but not write access to the persistent production store.

17. The system of claim 12, wherein the policy manager further comprises a configuration program operable to export the staging policy to a file and to import the staging policy into the persistent production store.

18. A computer storage device having computer-executable instructions, which when executed perform actions, comprising:
granting a first set of rights to a configuration entity, the rights including a right that allows the configuration entity to read a staging policy from a staging store, and a right that allows the configuration entity to write the staging policy to the staging store from a persistent production store, the rights not including a right that allows the configuration entity to write the production policy to the persistent production store, the staging store operable to store one or more policies that are not allowed to be applied until the one or more policies are stored on the persistent production store;
granting a second set of rights to a policy manager, the rights including a right that allows the policy manager to read the staging policy from the staging store and a right that allows the policy manager to write the production policy to the persistent production store;
receiving a request from the policy manager to store the production policy on the persistent production store; and
in response to receiving the request, storing the production policy on the persistent production store, where the production policy is stored to be applied to a runtime computer to configure the runtime computer to enforce the production policy.

19. The computer storage device of claim 18, further comprising:
receiving a request from the configuration entity to read the staging policy and in response, providing access to the configuration entity to read the staging policy; and
receiving a request from the configuration entity to write an updated staging policy to the staging store and in response, providing access to the configuration entity to write the updated staging policy to the staging store.

20. The computer storage device of claim 18, wherein enforcing the production policy comprises at least one of setting a flag, informing an enforcement mechanism that the production policy has changed or has been created, releasing a lock or database resource or completing a copying of the staging policy to the production store, and wherein the policy manager is configured to receive an indication of the staging store for use in storing the staging policy, wherein receiving the indication of the staging store for use in storing the staging policy comprises receiving an identifier of a database object for use in reading and writing the staging policy.

* * * * *